US008566257B2

(12) United States Patent
Armstrong et al.

(10) Patent No.: US 8,566,257 B2
(45) Date of Patent: Oct. 22, 2013

(54) ADDRESS DATA LEARNING AND REGISTRATION WITHIN A DISTRIBUTED VIRTUAL BRIDGE

(75) Inventors: William J. Armstrong, Rochester, MN (US); Claude Basso, Raleigh, NC (US); Josep Cors, Rochester, MN (US); David R. Engebretsen, Cannon Falls, MN (US); Kyle A. Lucke, Oronoco, MN (US); David A. Shedivy, Rochester, MN (US); Colin B. Verrilli, Apex, NC (US); Bruce M. Walk, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 718 days.

(21) Appl. No.: 12/767,506

(22) Filed: Apr. 26, 2010

(65) Prior Publication Data

US 2011/0264610 A1 Oct. 27, 2011

(51) Int. Cl.
*G06F 15/18* (2006.01)

(52) U.S. Cl.
USPC ........................................................... 706/12

(58) Field of Classification Search
None
See application file for complete search history.

(56) References Cited

U.S. PATENT DOCUMENTS

| 7,107,360 | B1 * | 9/2006 | Phadnis et al. ............... 709/250 |
| 7,167,922 | B2 * | 1/2007 | Narayanan .................... 709/242 |
| 8,085,791 | B1 * | 12/2011 | Aggarwal et al. ............ 370/400 |
| 8,090,805 | B1 * | 1/2012 | Chawla et al. ................ 709/221 |
| 8,121,126 | B1 * | 2/2012 | Moisand et al. .............. 370/392 |
| 8,190,960 | B1 * | 5/2012 | Bahadur et al. .............. 714/751 |
| 8,345,536 | B1 | 1/2013 | Rao et al. |
| 8,358,661 | B2 * | 1/2013 | Armstrong et al. ........... 370/401 |
| 8,369,296 | B2 * | 2/2013 | Armstrong et al. ........... 370/338 |
| 8,379,642 | B2 * | 2/2013 | Armstrong et al. ........... 370/390 |
| 8,385,356 | B2 * | 2/2013 | Armstrong et al. ........... 370/401 |
| 8,447,909 | B2 * | 5/2013 | Corrigan et al. .............. 710/311 |
| 2004/0037279 | A1 | 2/2004 | Zelig et al. |
| 2006/0149886 | A1 | 7/2006 | Chen et al. |
| 2007/0260910 | A1 | 11/2007 | Jain et al. |
| 2007/0299987 | A1 | 12/2007 | Parker et al. |
| 2008/0159277 | A1 | 7/2008 | Vobbilisetty et al. |
| 2009/0201928 | A1 | 8/2009 | Chen et al. |
| 2011/0264610 | A1 | 10/2011 | Armstrong et al. |
| 2012/0147743 | A1 | 6/2012 | Singh et al. |

FOREIGN PATENT DOCUMENTS

WO 2010024993 A1 3/2010

OTHER PUBLICATIONS

IBM Patent U.S. Appl. No. 13/352,952 entitled "Requesting Multicast Membership Information in a Distributed Switch in Response to a Miss Event," filed Jan. 18, 2012 by Debra L. Angst et al.

IBM Patent U.S. Appl. No. 13/352,973 entitled "Managing a Global Forwarding Table in a Distributed Switch," filed Jan. 18, 2012 by Debra L. Angst et al. (Continued)

*Primary Examiner* — Michael B Holmes
(74) *Attorney, Agent, or Firm* — Toler Law Group

(57) ABSTRACT

Systems and methods to forward data frames are provided. A particular apparatus may include a plurality of server computers and a distributed virtual bridge. The distributed virtual bridge may include a plurality of bridge elements coupled to the plurality of server computers and configured to forward a data frame between the plurality of server computers. The plurality of bridge elements may further be configured to automatically learn address data associated with the data frame. A controlling bridge may be coupled to the plurality of bridge elements. The controlling bridge may include a global forwarding table that is automatically updated to include the address data and is accessible to the plurality of bridge elements.

20 Claims, 6 Drawing Sheets

(56) References Cited

OTHER PUBLICATIONS

IBM Patent U.S. Appl. No. 12/751,187 entitled "Data Frame Forwarding Using a Multitiered Distributed Virtual Bridge Hierarchy," filed Mar. 31, 2010 by William J. Armstrong et al.

IBM Patent U.S. Appl. No. 12/751,249 entitled "Data Frame Forwarding Using a Distributed Virtual Bridge," filed Mar. 31, 2010 by William J. Armstrong et al.

IBM Patent U.S. Appl. No. 12/763,306 entitled "Distributed Virtual Bridge Management," filed Apr. 20, 2010 by William J. Armstrong et al.

IBM Patent U.S. Appl. No. 12/763,323 entitled "Remote Adapter Configuration," filed Apr. 20, 2010 by William J. Armstrong et al.

IBM Patent Application ROC920090060 entitled "Distributed Link Aggregation," filed Apr. 26, 2010 by William J. Armstrong et al.

IBM Patent Application ROC920090061 entitled "Multicasting Using a Multitiered Distributed Virtual Bridge Hierarchy," filed Apr. 26, 2010 by William J. Armstrong et al.

IBM Patent Application ROC920090066 entitled "Priority Based Flow Control Within a Virtual Distributed Bridge Environment," filed Apr. 26, 2010 by William J. Armstrong et al.

\* cited by examiner

"Prior Art"

ADDRESS DATA LEARNING AND REGISTRATION WITHIN A DISTRIBUTED VIRTUAL BRIDGE

I. FIELD OF THE DISCLOSURE

The present disclosure relates generally to data communications, and more specifically, to routing data frames within a highly integrated environment.

II. BACKGROUND

Server computers may be continuously managed to enable access to shared switches and other traffic routing resources. For example, contention for routing resources may exist when server computers are housed within racks for space and connectivity considerations, such as in a blade server computer arrangement. The server computers may experience transmission bottlenecks and delays when forwarding data frames through centralized switches, such as shared top of rack switches.

To illustrate, FIG. 1 shows a conventional blade server computer system 100. The system 100 includes a plurality of server computers 106-125 housed within racks 102, 104 and arranged into chassis 138, 140, 142, and 144. An illustrative server computer 106 may include a half-width information technology element (ITE) blade server computer.

Data frame communications between the server computers 106-125 housed within different chassis 138, 140, 142, 144 or racks 102, 104 may be referred to as east-west connectivity. For example, the server computer 111 of a first chassis 140 may forward a data frame to the server computer 106 of another chassis 138 via a path 164. The path 164 includes a chassis switch 154 and a top of rack switch (TOR) 158. The chassis switch 154 and the top of rack switch 158 may route the data frame based upon a media access control (MAC) address.

When the server computer 111 of the rack 102 forwards a data frame to the server computer 123 of the rack 104, the data frame travels through paths 166 and 168. The paths 166 and 168 include the top of rack switch 158 associated with the rack 102, an end of rack switch (EOR) 162, and a top of rack switch 160 associated with the rack 104, as well as the chassis switches 154 and 156. The top of rack switch 158 is again used when the server computer 111 attempts north-south connectivity (i.e., internal to external data frame communication) through paths 166 and 170. Because the data frames in the above examples are all routed through the top of rack switches 158, 160, a potential bottleneck scenario can result.

Increasing the number of switches and associated connections to accommodate additional traffic may present configuration and management challenges, as well as increase hardware costs and latency. For example, an increased number of switches may complicate access to address information used to route data frames.

III. SUMMARY OF THE DISCLOSURE

In a particular embodiment, an apparatus may include a plurality of server computers and a distributed virtual bridge. The distributed virtual bridge may include a plurality of bridge elements coupled to the plurality of server computers and configured to forward a data frame between the plurality of server computers. The plurality of bridge elements may further be configured to automatically learn address data associated with the data frame. A controlling bridge may be coupled to the plurality of bridge elements. The controlling bridge may include a global forwarding table that is automatically updated to include the address data and is accessible to the plurality of bridge elements.

In another embodiment, a method is disclosed that includes receiving a data frame at a distributed virtual bridge. The distributed virtual bridge may include a first bridge element coupled to a first server computer. The first bridge element may be configured to automatically learn address data from the data frame. A controlling bridge may be coupled to the first bridge element. The controlling bridge may include a global forwarding table configured to store the address data acquired by the first bridge element. The data frame may be forwarded from the first bridge element to a second bridge element of the distributed virtual bridge using the address data.

In another embodiment, a program product may include program code executable at a bridge element of a distributed virtual bridge to receive a data frame and to learn address data from the data frame. The program code may be further executable to store the address data at the bridge element. The address data may also be stored at a controlling bridge that is coupled to the bridge element. A computer readable storage medium may bear the program code.

An embodiment may facilitate automatic address data learning and registration in manner that may increase routing efficiency. Cost and space demands may be reduced, and an embodiment of a system may be scalable to include hundreds or more server computers with direct connectivity.

Features that characterize embodiments are set forth in the claims annexed hereto and forming a further part hereof. However, for a better understanding of embodiments, and of the advantages and objectives attained through their use, reference should be made to the Drawings and to the accompanying descriptive matter.

IV. BRIEF DESCRIPTION OF THE DRAWINGS

V. DETAILED DESCRIPTION

Figure 2:
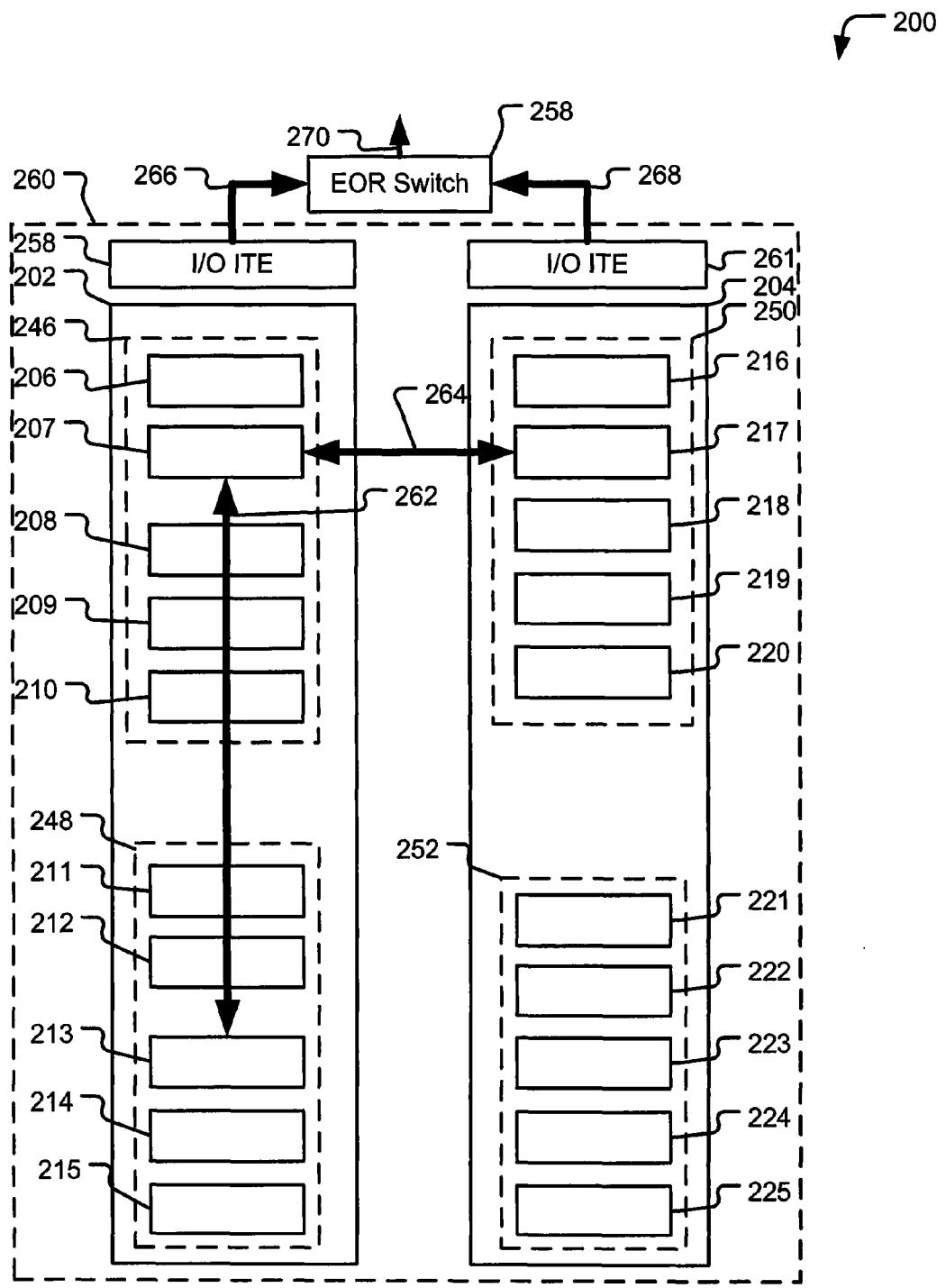
FIG. 2 is a block diagram of an embodiment of a highly integrated computing system configured to allow direct communication between server computers housed within different racks and chassis of blade server computers.

Turning particularly to the drawings, FIG. 2 shows an illustrative embodiment of a highly integrated system 200 configured to forward data frames using a distributed virtual bridge 260. The distributed virtual bridge 260 may extend across server computers 206-225, chassis 246, 248, 250, 252, and racks 202, 204 to provide data link layer (e.g., Layer 2) switching between bridge elements. The bridge elements may provide a frame-based, Ethernet-like interface. The interface may facilitate lossless, point-to-point, in-order frame delivery between server computers 206-225 of different racks 202, 204 or chassis 246, 248, 250, 252 (i.e., east-west connectivity) with reduced redundancy and latency.

The system 200 further includes an end-of-rack switch (EOR) 270 and input/output (I/O) server ITEs 258, 261 that enable north-south connectivity. The I/O server ITEs 258, 261 may enable uplink connectivity to an external Ethernet network (or other network) for the server computers 206-225 housed within the racks 202, 204.

Figure 1:
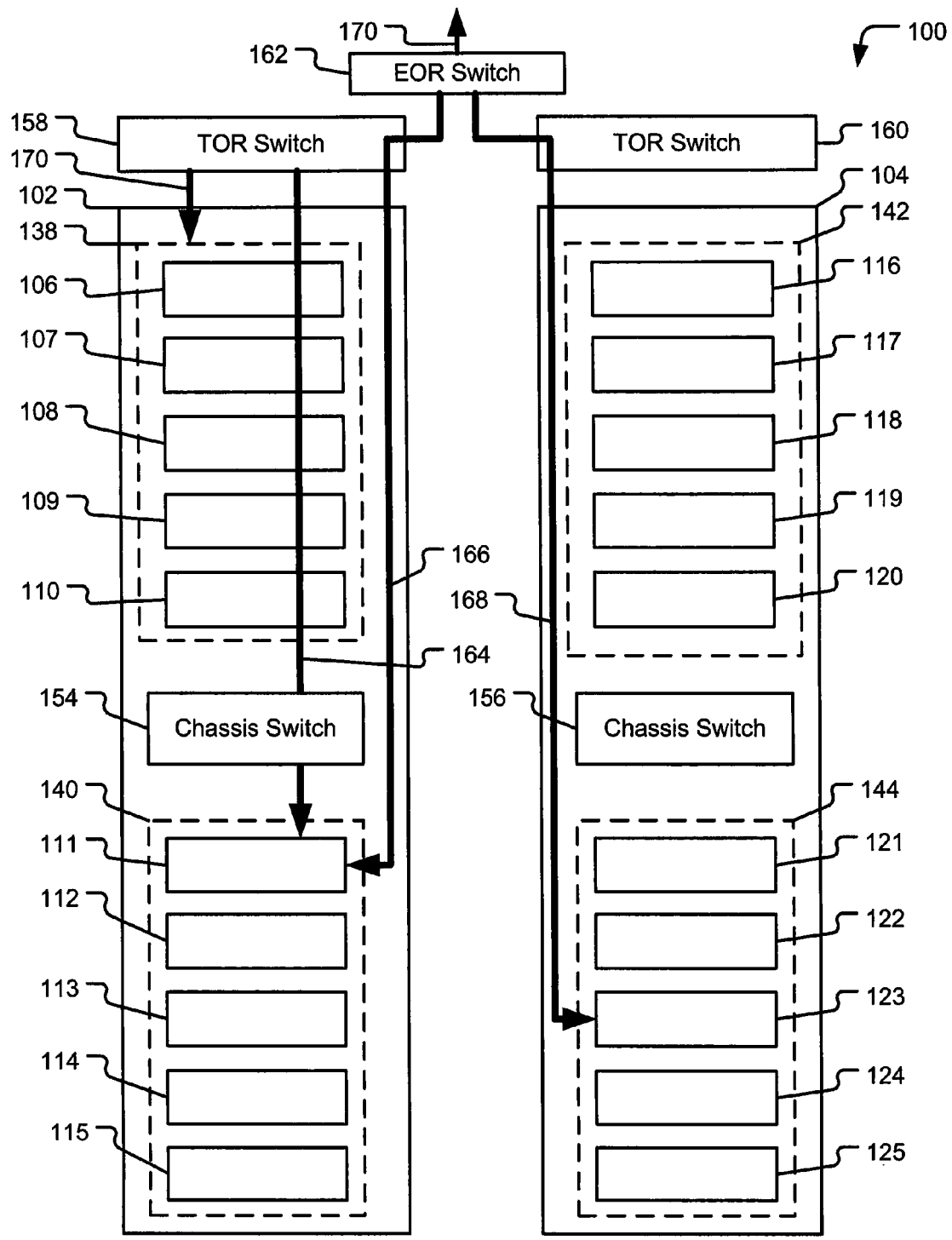
FIG. 1 is a block diagram of a prior art computing system that includes racks of blade server computers.

An arrow 264 of FIG. 2 represents direct east-west connectivity and the flow of data frames between server computers located in different racks 202, 204 of the system 200 (e.g., without using a top of rack or chassis switch, such as switches 158, 160 of FIG. 1). An arrow 262 represents direct east-west connectivity across different chassis 246, 248 of the rack 202.

The system 200 of FIG. 2 may enable direct connectivity between server computers of different racks or chassis. To accommodate the relatively high level of system integration, distributed bridge elements may be programmed to independently route data frames. The distribution of routing processes may streamline the routing of data frames and facilitate scalability. The bridge elements and distributed routing within the distributed virtual bridge 260 may reduce contention for resources and increase data frame traffic flow.

Figure 3:
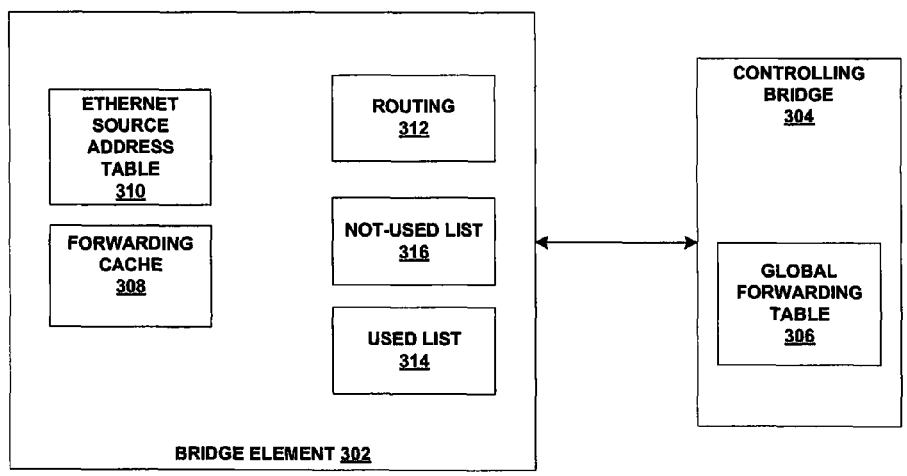
FIG. 3 is a block diagram of a particular embodiment of a system comprising a bridge element and a controlling bridge configured to learn and register address data.

FIG. 3 shows a system 300 configured to acquire and maintain address data address data used to route data frames within a distributed virtual bridge that includes a bridge element 302 and a controlling bridge 304. The distributed virtual bridge may be similar to the distributed virtual bridge 260 of FIG. 2. The bridge element 302 and the controlling bridge 304 may work in conjunction to reduce flooding and allow for increased scalability.

The controlling bridge 304 may include a global forwarding table 306. The global forwarding table 306 may include a multitude of entries. The entries may include address data, e.g., Media Access Control (MAC) addresses, that has been recognized by bridge elements and that has been registered with the controlling bridge 304. Entries within the global forwarding table 306 may be removed or updated by the controlling bridge 304. A key used for lookups in the global forwarding table 306 may include a logical network identifier, a virtual local area network (VLAN) identifier, or a MAC address.

Address data in the controlling bridge 304 may additionally be reported when the bridge element 302 acts a proxy. Proxy registration may reduce flooding occurrences. When the bridge element 302 learns that an address is external, the controlling bridge 304 may be notified (i.e., proxy registration) of the external address. Other bridge elements may access the updated address data of the controlling bridge 304.

The bridge element 302 may include a forwarding cache 308. The forwarding cache 308 may include a lookup table that stores address data used to forward data frames that are received by the bridge element 302. The forwarding cache 308 may include locally learned entries, as well as entries obtained through a search of the global forwarding table 306.

When a data frame is received, the bridge element 302 may learn the source addresses and insert an entry into the forwarding cache 308. Learning in a forwarding cache may occur on an egress bridge element when a data frame is received from a transport layer module (in). This action may be taken to anticipate the return flow of data frames. The source addresses may be additionally learned onto a not-used list 316. The not-used list 316 may include a temporary list that may be reused more quickly than a used list 314. When a return data frame arrives, the address data may be moved to the used list 314.

More particularly, memory comprising the not-used list 316 may include address data that has been learned, but has not yet been used. For instance, an entry in the not-used list 316 may correspond to a MAC address that has been identified as a source address, but that has not been used as a destination address. The not-used list 316 is of limited size to reduce memory resources allocated to that are learned but never used. A count of entries in the not-used list 316 may be maintained. When this count reaches a threshold, no new entries may be added to the not-used list 316 unless entries are removed, or replaced. Invalid entries may be stored at the top of the used list 314. Newly learned entries may be added to the end of the not-used list 316. In this manner, the number of entries in the not used list 316 may be maintained under a preset number.

The used list 314 may include entries added as a result of destination address forwarding. An entry in the not-used list 316 may be marked as used and moved over to the used list 314. This movement may result when a destination address lookup (e.g., of a frame received from an Ethernet port at an ingress bridge element) results in a hit. The hit entry in the not-used 316 may have been source address learned, but not yet hit.

The bridge element 302 may additionally include an Ethernet-source address table 310. The Ethernet-source address table 310 may maintain source address information for the system 300 to facilitate validation and registration processes. Validation may include a verification that a source address of a data frame is allowed to be sourced onto an ingress port of the bridge element 302. This process may be termed "spoof checking." Registration may include a notification to the controlling bridge 304 that a received source address is active on a port of the bridge element 302. Validation may be an optional function in the bridge element 302.

Before allowing a data frame to enter the bridge element 302, the bridge element 302 may check the Ethernet-source address table 310. If the entry is found and is marked "permit" for the port, the data frame may be allowed to enter the bridge element 302.

A routing algorithm 312 may be used by the bridge element 302 to independently forward data frames. The routing algorithm 312 may be provided and updated by the controlling bridge 304.

In operation, the bridge element 302 may attempt to obtain a route to a MAC address by performing a hardware lookup on the global forwarding table 306 of the controlling bridge 304. In the case where a bridge element is not local to the controlling bridge, the remote bridge element may send a query request message to the bridge element 302 that is directly coupled to a controlling bridge. The local bridge element 302 may perform a hardware lookup on the global forwarding table of the controlling bridge and may return an answer to the querying bridge element.

Should there be a miss or a timeout during the query lookup, the logical network and the VLAN may undergo a flooding operation. A forwarding cache 308 may additionally include source addresses learned from packets arriving at the bridge element. The forwarding cache 308 may use similar search criteria and may have a similar structure as the global forwarding table 306.

When a bridge element receives a query failure on a destination address lookup, the bridge element may broadcast the data frame during a flooding operation for the logical network and the VLAN, as well as to the uplink. The destination address may additionally be inserted into the forwarding cache 308 as an entry marked "flood." When the computing node associated with the destination address responds to the flood operation, the bridge element 302 may determine that the response includes a source address that corresponds to the destination address of the previously flooded data frame. The source address lookup in the forwarding cache 308 may locate the entry that indicates flooding. The flood entry may be replaced with the address data associated with the responding computing node. The next occurrence that a data frame is forwarded to the computing node, the forwarding cache 308 may successfully locate the destination address without flooding.

The system 300 may detect the movement of MAC addresses inside and outside of the network. MAC address may change when a virtual machine moves to another server. In such a case, the virtual machine movement may be detected, and the associated address data may be updated in the global forwarding table to allow future queries to retrieve the correct routing information. For example, an egress bridge element may detect the movement by performing a lookup on the Ethernet-source address table. If it is determined that a MAC address that was previously on a local port has moved to another bridge element port, the MAC address may be de-registered. The controlling bridge may be notified. A bridge element now associated with the MAC address of the moved virtual machine may also detect the change, using source Ethernet-source address lookup for movement detection. Other bridge elements throughout the distributed virtual bridge may additionally detect the change using source address learning.

In the case where a virtual machine moves from an internal address to a location that is external to the network, the controlling bridge 304 may be notified of the movement by the deregistration of the controlling bridge that was previously assigned to the virtual machine. When a virtual machine moves from an external location to an internal address, the bridge element that is assigned the virtual machine may discover the new source address using its Ethernet-source address table. That bridge element may then notify the controlling bridge of the new address.

Features of the system 300 may minimize flooding and allow for increased scalability. Aspects may further minimize head-of-line blocking, where frames may wait to be forwarded due to unknown destinations and should not delay other frames for which the destination is known. The routing of data frames for which the destination is known may not be delayed behind data frames waiting to be routed until the address is known.

Figure 4:
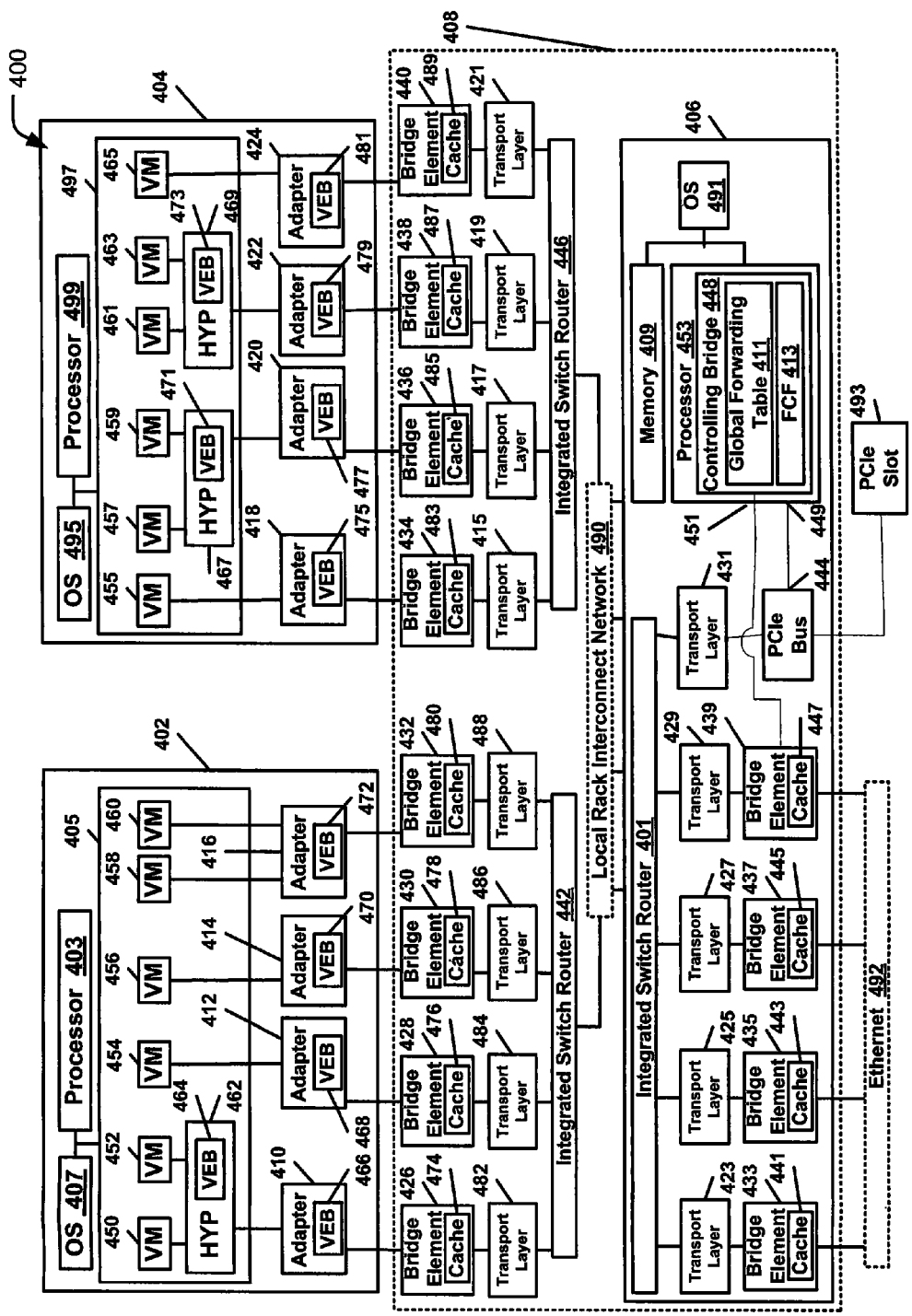
FIG. 4 is a block diagram of a particular embodiment of a system including a distributed virtual bridge configured to route data frames.

Referring to FIG. 4, another particular illustrative embodiment of a highly integrated system 400 configured to route data frames using distributed bridge elements is depicted. FIG. 4 generally shows a computer system 400 configured to forward data frames using a distributed virtual bridge 408. The distributed virtual bridge 408 may selectively forward management frames to distributed switches (e.g., bridge elements and adapters).

The distributed virtual bridge 408 may be similar to the distributed virtual bridge 260 of FIG. 2. The system 400 includes a first server computer 402 and a second server computer 404 that are both coupled to an I/O blade device 406 via the distributed virtual bridge 408. The server computers 402, 404 and the I/O blade device 406 may be housed within separate chassis and racks. For example, the server computers 402, 404 and the I/O blade device 406 may correspond respectively to the server computers 210, 220 and the I/O ITE 261 of FIG. 2

The distributed virtual bridge 408 may be coupled to multiple adapters 410, 412, 414, 416, 418, 420, 422, and 424. The adapters 410, 412, 414, 416, 418, 420, 422, and 424 may be located within or may be coupled to the server computers 402, 404. The distributed virtual bridge 408 may use multiple access points, or bridge elements 426, 428, 430, and 432-440 to couple to the server computers 402, 404. For example, a microchip that includes the bridge elements 426, 428, 430, and 432 may be cabled or otherwise coupled to a port of the server computer 402 that includes the adapter 410. As explained herein, the distributed virtual bridge 408 may functionally supplant chassis switches and top of rack switches with a frame-based network fabric that functions in a similar fashion to an Ethernet network.

One or more transport layer modules 482, 484, 486, and 488 coupled to the bridge elements 426, 428, 430, and 432 may provide a frame-based, Ethernet-like interface to one or more integrated switch routers 442. The transport layer module 482 may be configured to deconstruct a transmission of data frames so that packet information may be evenly distributed across links to a local rack interconnect 490. The data frames may not be serialized upon leaving the transport layer module 482. A receiving transport layer module 423 may serialize the data frames to achieve reliable, in-order delivery. If the receiving transport layer module 423 determines that data frame information is missing, the transport layer module 423 may initiate a process to recover the missing data. The translation process may be accomplished in hardware, which may provide a larger bandwidth and faster processing than software applications. The transport layer modules 482, 484, 486, and 488, the integrated switch router 442, and the local rack interconnect network 490 may combine to include an underlying lossless, point-to-point communication network (i.e., an integrated switch router network) between the server computers 402, 404 and the I/O blade device 406.

The bridge elements 426, 428, 430, and 432 may function as data link layer (i.e., Layer 2) bridge forwarders within the distributed virtual bridge 408. In particular embodiments, the bridge elements 426, 428, 430, and 432 may comprise a switch, or router device. The bridge elements 426, 428, 430, and 432 may include learned (e.g., received and stored) cached address data used to forward data frames throughout the distributed virtual bridge 408. The learned address data may correspond to one or both of a destination address and a source address associated with a data frame.

When the bridge element 426 does not include address data pertinent to a source or destination address of a received data frame, the bridge element 426 may query a controlling bridge 448 for the address data. The controlling bridge 448 may include a global forwarding table 411 that includes stored address data. The stored address data may be continuously updated by the bridge elements 426, 428, 430, and 432. For example, a bridge element 426 may send an update message to the controlling bridge 448 in response to learning an updated or new MAC address. A corresponding MAC address in the global forwarding table 411 may be subsequently updated.

Conversely, the address data of the global forwarding table 411 may be used to update the bridge elements 426, 428, 430, and 432. For example, the controlling bridge 448 may respond to a query from the bridge element 426 with requested address data. The bridge element 426 may cache the received address data for future use (e.g., at the forwarding cache 474).

The first server computer 402 may comprise a blade server computer, such as the server computer 206 shown in FIG. 2. The first server computer 402 may include one or more virtual machines (VMs) 450, 452, 454, 456, 458, and 460. A virtual machine may include a software implementation of a computer and may execute programs in a manner similar to a physical machine.

FIG. 4 shows an illustrative hypervisor 462 that is coupled to both the virtual machine 450 and the virtual machine 452. The hypervisor 462 may include platform virtualization software that allows multiple operating systems to run concurrently on the first server computer 402. The hypervisor 462 may include a hypervisor virtual bridge 464 that allows direct communication between the virtual machines 450, 452 without traversal of an external network. In one embodiment, the hypervisor virtual bridge 464 may register address information with the controlling bridge 448.

The first server computer 402 may include at least one processor 403 coupled to a memory 405. The processor 403 may represent one or more processors (e.g., microprocessors), and the memory 405 may represent random access memory (RAM) devices comprising the main storage of the server computer 402, as well as supplemental levels of memory, e.g., cache memories, non-volatile or backup memories (e.g., programmable or flash memories), read-only memories, etc. In addition, the memory 405 may be considered to include memory storage physically located in the first server computer 402 or on another server computer coupled to the server computer 402 via the distributed virtual bridge 408 (e.g., the second server computer 404).

The first server computer 402 may operate under the control of an operating system (OS) 407 and may execute or otherwise rely upon various computer software applications, components, programs, objects, modules, and data structures, such as the virtual machines 450, 452, 454, 456, 458, and 460. Moreover, various applications, components, programs, objects, modules, etc. may also execute on one or more processors in another device coupled to the server computer 402 (e.g., in a distributed computing environment, where computing processes may be allocated to multiple server computers).

The first server computer 402 may include adapters 410, 412, 414, and 416, such as converged network adapters. A converged network adapter may include a single root I/O virtualization (SR-IOV) adapter, such as a Peripheral Component Interconnect Express (PCIe) adapter that supports Converged Enhanced Ethernet (CEE). Another embodiment of the system 400 may include a multi-root I/O virtualization (MR-IOV) adapter. The adapters 410, 412, 414, and 416 may be used to implement a Fiber Channel over Ethernet (FCoE) protocol. Each adapter 410, 412, 414, and 416 may be coupled to one or more of the virtual machines 450, 452, 454, 456, 458, and 460. The adapters 410, 412, 414, and 416 may facilitate shared access of the virtual machines 450, 452, 454, 456, 458, and 460. While the adapters 410, 412, 414, and 416 are shown in FIG. 4 as being included within the first server computer 402, adapters of another embodiment may include physically distinct devices that are separate from the server computers 402, 404.

Each adapter 410, 412, 414, and 416 may include a converged adapter virtual bridge 466, 468, 470, and 472. The converged adapter virtual bridges 466, 468, 470, and 472 may facilitate sharing of the adapters 410, 412, 414, and 416 by coordinating access by the virtual machines 450, 452, 454, 456, 458, and 460. Each converged adapter virtual bridge 466, 468, 470, and 472 may recognize data flows included within its domain, or addressable space. A recognized domain address may be routed directly, without processing or storage, outside of the domain of the particular converged adapter virtual bridge 466, 468, 470, and 472. Each adapter 410, 412, 414, and 416 may include one or more CEE transmit ports that couple to one of the bridge elements 426, 428, 430, and 432. In another embodiment, bridge elements may be co-located with the adapters, and coupling between adapters and the bridge elements may not be Ethernet connections.

The bridge elements 426, 428, 430, and 432 may be configured to forward data frames throughout the distributed virtual bridge 408. The bridge elements 426, 428, 430, and 432 may thus function as access points for the distributed virtual bridge 408 by translating between Ethernet and the integrated switch router 442. The bridge elements 426, 428, 430, and 432 may not include buffers and may support CEE at boundaries of the distributed virtual bridge 408. In another embodiment, the bridge elements 426, 428, 430, and 432 may include buffers.

Each bridge element 426, 428, 430, and 432 of the distributed virtual bridge 408 may include a forwarding cache 474, 476, 478, and 480. A forwarding cache 474, 476, 478, and 480 may include a lookup table that stores address data used to forward data frames that are received by the bridge elements 426, 428, 430, and 432. For example, the bridge element 426 may compare address data associated with a received data frame to the address data stored within the forwarding cache 474.

Illustrative address data may include routing information, such as a routing key included within header data of the data frame. The routing key may include at least one of a virtual local area network (VLAN) tag and a logical network identifier, as well as a MAC address. The MAC address may be generated and assigned by a Fiber Channel Forwarder (FCF) 413, as set by an administrator or computing system. The Fiber Channel Forwarder 413, or FCoE switch, may facilitate connectivity between FCoE initiators and Fiber Channel fabrics. To illustrate, an FCoE data frame sent from the first virtual machine 458 and intended for a second virtual machine 463 at the second server 404 may be addressed to the Fiber Channel Forwarder 413 in accordance with the FCoE standard. According to standard routing procedures, the Fiber Channel Forwarder 413 may receive and re-address the FCoE data frame for forwarding to the virtual machine 463.

The MAC address of the Fiber Channel Forwarder 413 may have been learned by the first server computer 402 during a discovery phase, when the Fiber Channel Forwarder 413 establishes communications with networked devices. During the discovery phase, the second server computer 404 may respond to broadcast queries from the first server computer 402. The Fiber Channel Forwarder 413 may discover the second server computer 404 from the query responses. After the discovery phase, a login phase may be initiated. A MAC address of the server computer 404 may be reassigned by the Fiber Channel Forwarder 413. The reassigned MAC address may be used for subsequent routing and communications between the server computers 402, 404. The Fiber Channel Forwarder 413 may facilitate storage of MAC addresses assigned to the server computers 402, 404.

A VLAN tag may indicate an assigned VLAN, which may be used to segregate traffic and to allow more than one uplink. There may be multiple VLANs on an uplink. Conventionally, each VLAN may use only one uplink port. That is, only one physical uplink port at a given time may be used to forward a data frame associated with a particular VLAN. Through the use of logical networks, a VLAN may use multiple physical ports to forward traffic while maintaining traffic segregation. Link aggregation may be used to bundle several physical links to act as one uplink with higher bandwidth.

A logical network may include a logically specified network portion of the distributed virtual bridge 408. Multiple logical networks may be included within a single bridge element. As such, a logical network may provide an additional layer of traffic separation. When so configured, logical networks may allow different customers to use the same VLAN tag. The VLANs of each customer may remain segregated by virtue of the different logical networks.

The forwarding caches 474, 476, 478, and 480 of the distributed virtual bridge 408 may have a format similar to the global forwarding table 411 of the controlling bridge 448. The forwarding caches 474, 476, 478, and 480 may have smaller memory capacities than the global forwarding table 411. The forwarding caches 474, 476, 478, and 480 may further be updated with address data learned from data frames that flow through the bridge elements 426, 428, 430, and 432.

The address data may additionally be updated with address data received from the global forwarding table 411. Invalid or changed address data that is updated within one or more of the forwarding caches 474, 476, 478, and 480 of the bridge elements 426, 428, 430, and 432 may be communicated to the global forwarding table 411 of the controlling bridge 448. For example, the bridge element 426 may learn a new MAC address of a newly added device that is configured to receive from or send data to the distributed virtual bridge 408.

The bridge element 426 may verify that a source MAC address included within a received data frame is allowed at a port by checking a list stored within a memory. The bridge element 426 may send a registration message to the controlling bridge 448 to update the global forwarding table 411 with the verified MAC address. The bridge element 426 may further store the MAC address within the forwarding cache 474. In another example, the bridge element 426 may identify a MAC address that is infrequently used. This infrequently used MAC address may be removed from the forwarding cache 474 to make storage room available for other MAC addresses. The bridge element 426 may send an update message to the controlling bridge 448 to have the MAC address removed from the global forwarding table 411.

Address data stored within the global forwarding table 411 may be communicated to one or more forwarding caches 474, 476, 478, and 480 of the distributed virtual bridge 408. For example, the bridge element 426 may receive a data frame that includes a destination MAC address that is not stored within the forwarding cache 474. To obtain information for forwarding the data frame, the bridge element 426 may send a query to a bridge element 439 configured to access the controlling bridge 448. The bridge element 439 may search the global forwarding table 411 for address data associated with the destination MAC address. If the address data is found, the bridge element 439 may forward the MAC address through the distributed virtual bridge 408 to the querying bridge element 426. The bridge element 426 may store the MAC address as address data within the forwarding cache 474. As with the global forwarding table 411, the address data included within the forwarding caches 474, 476, 478, and 480 of the distributed virtual bridge 408 may include both internal address information, as well as addresses that are external to the system 400.

Each of the bridge elements 426, 428, 430, and 432 may be connected to one or more transport layer modules 482, 484, 486, and 488. The transport layer modules 482, 484, 486, and 488 may include buffering used for attachment to the integrated switch router 442. The transport layer modules 482, 484, 486, and 488 may further provide a frame-based, Ethernet-like interface to the integrated switch router 442.

The transport layer modules 482, 484, 486, and 488 may each include a shared buffer used to transmit frames across the integrated switch router 442. Additional buffers of the transport layer modules 482, 484, 486, and 488 may be used to receive data frames from the integrated switch router 442. The buffers may be divided into different virtual lanes. Virtual lanes may include logically separated paths for data frame traffic flowing between a bridge element and a transport layer module. For example, there may be four virtual lanes between the bridge element 426 and the transport layer module 482. The virtual lanes may correspond to differently prioritized traffic. The transport layer modules 482, 484, 486, and 488 may include logic to recover from faulty microchips and links between a source and a destination. The transport layer modules 482, 484, 486, and 488 may maintain a strict ordering of packets within a particular virtual lane regardless of each data frame's path through the local rack interconnect network 490 and the computer system 400.

The integrated switch router 442 may communicate with the transport layer modules 482, 484, 486, and 488 and may facilitate routing and packet delivery to and from the local rack interconnect network 490. The local rack interconnect network 490 may include links to the bridge elements 426, 428, 430, and 432 located within the same chassis and rack, as well as links to the bridge elements 434-440 in different chassis and racks. The local rack interconnect network 490 may include point-to-point connections, or pipes, between the bridge elements 426, 428, 430, 432, and 433-440 of the distributed virtual bridge 408 with no frame loss and with in-order frame delivery.

The second server computer 404 may include a server computer similar to the first server computer 402 and may be similar to the server computer 206 of FIG. 2. As such, the second server computer 404 may be located within a different chassis and rack than the first server computer 402. The first server computer 402, the second server computer 404 may include a processor 499 coupled to a memory 497 and to an operating system 495. The second server computer 404 may further include virtual machines 455, 457, 459, 461, 463, and 465.

A hypervisor 467 may be coupled to the virtual machines 457, 459. The hypervisor 467 may include a hypervisor virtual bridge 471 that allows direct communication between the virtual machines 457, 459. A hypervisor virtual bridge 473 of a hypervisor 469 coupled to the virtual machines 461, 463 may facilitate direct communication between the virtual machines 461, 463. For example, the hypervisor virtual bridges 471, 473 may register address data with the controlling bridge 448.

The second server computer 404 may also include one or more adapters 418, 420, 422, and 424, such as converged CEE network adapters. Each adapter 418, 420, 422, and 424 may be coupled to one or more of the virtual machines 455, 457, 459, 461, 463, and 465. The adapters 418, 420, 422, and 424 may each include a converged adapter virtual bridge 475, 477, 479, and 481. The converged adapter virtual bridges 475, 477, 479, and 481 may facilitate sharing of the adapters 418, 420, 422, and 424 by coordinating virtual machine access. The adapters 418, 420, 422, and 424 may each couple to one or more of the bridge elements 434, 436, 438, and 440 of the distributed virtual bridge 408. Each adapter 418, 420, 422, and 424 may include one or more CEE transmit ports that couple to one of the bridge elements 434, 436, 438, or 440.

Each bridge element 434, 436, 438, and 440 may include a forwarding cache 483, 485, 487, and 489 that includes address data used to forward data frames that are received by the bridge elements 434, 436, 438, and 440. The bridge elements 434, 436, 438, and 440 may each be connected to one or more transport layer modules 415, 417, 419, and 421. The transport layer modules 415, 417, 419, and 421 may include buffering used for the attachment to the integrated switch router 446. The transport layer modules 415, 417, 419, and 421 may further provide a frame-based, Ethernet-like interface to the integrated switch router 446 and may maintain packet ordering. A portion of the distributed virtual bridge 408 shown in FIG. 4 as located above the local rack interconnect network 490 and as associated with the server computers 402, 404 may be referred to as a north portion. The north bridge elements 426, 428, 430, 432, 434, 436, 438, and 440 may be coupled to the adapters 410, 412, 414, 416, 418, 420, 422, and 424.

The I/O blade device 406 may be the I/O server computer 258 of FIG. 2. As such, the I/O blade device 406 may allow uplink connectivity to an external Ethernet network 492 via an integrated switch router 401 that is coupled to transport layer modules 423, 425, 427, 429, and 431.

The transport layer modules 423, 425, 427, 429, and 431 may each couple to a bridge element 433, 435, 437, and 439. The bridge elements 433, 435, 437, and 439 may each include a forwarding cache 441, 443, 445, and 447. The I/O blade device 406 may be categorized as being included within a south portion of the distributed virtual bridge 408 because the bridge elements 433, 435, 437, and 439 may be coupled to an uplink to the Ethernet network 492.

The I/O blade device 406 may include a memory 409, an operating system 491, and a processor 453 that includes the controlling bridge 448. The bridge element 439 may be coupled to the processor 453 via an Ethernet link connection. The transport layer module 431 may be coupled to a PCIe bus 444 that is coupled via a PCIe link connection to the processor 453 and the controlling bridge 448. The PCIe bus 444 may also be coupled to a PCIe slot 493. The processor 453 may further include a Peripheral Component Interconnect Manager (PCIM) 451.

The controlling bridge 448 may communicate with the bridge elements 426, 428, 430, and 432-440 and other controlling bridges (not shown) of the computer system 400. The controlling bridge 448 may include firmware executing on the processor 453 that manages the bridge elements 426, 428, 430, and 432-440. For example, the controlling bridge 448 may be configured to divide a workload between the bridge elements 426, 428, 430, and 432-440, as well as perform synchronization procedures and failover operations.

The controlling bridge 448 may be configured to interface with and program the bridge elements 426, 428, 430, 432-440 and the adapters 466, 468, 470, 472, 475, 477, 479, 481. More particularly, the controlling bridge 448 may be configured to generate and send a management frame to one or more of the bridge elements 426, 428, 430, 432-440 and the adapters 466, 468, 470, 472, 475, 477, 479, 481. The management frames may include instructions used to program operating parameters of the bridge elements 426, 428, 430, 432-440 and the adapters 466, 468, 470, 472, 475, 477, 479, 481 and other switches.

The controlling bridge 448 may include the Fiber Channel Forwarder 413. FCoE may offer the capability to transport fiber channel payloads on top of an Ethernet network. The Fiber Channel Forwarder 413 may execute the Fiber Channel Initialization Protocol to discover and initialize FCoE capable entities connected to an Ethernet cloud. The Fiber Channel Forwarder 413 may further include firmware that encapsulates and de-encapsulates Fiber Channel data frames (e.g., FCoE formatted data frames). In at least one embodiment, the Fiber Channel Forwarder 413 may translate between Ethernet and Fiber Channel protocols.

The controlling bridge 448 may additionally include the global forwarding table 411. The global forwarding table 411 may include address data (e.g., MAC addresses) that is registered and maintained through communication and cooperation with the bridge elements 426, 428, 430, and 432-440, and in some cases, the hypervisors 462, 467, and 469.

In one example, the global forwarding table 411 may maintain MAC addresses that have been learned by a bridge element 426. The bridge element 426 may register the address data with the controlling bridge 448. The controlling bridge 448 may update the global forwarding table 411 by adding the address data to the global forwarding table 411. Similarly, the bridge element 426 may cause the controlling bridge 448 to update the global forwarding table 411 by sending an update message to the controlling bridge 448. The update message may cause the controlling bridge 448 to delete a MAC address that has been aged out by the bridge element 426. A MAC address may further be deleted when the bridge element 426 has detected that the address data is no longer valid.

In another example, the hypervisor virtual bridge 464 may register MAC addresses or other address data with the controlling bridge 448. The global forwarding table 411 may include address data associated with addresses that are included within the system 400, as well as addresses that are external to the system 400.

Figure 5:
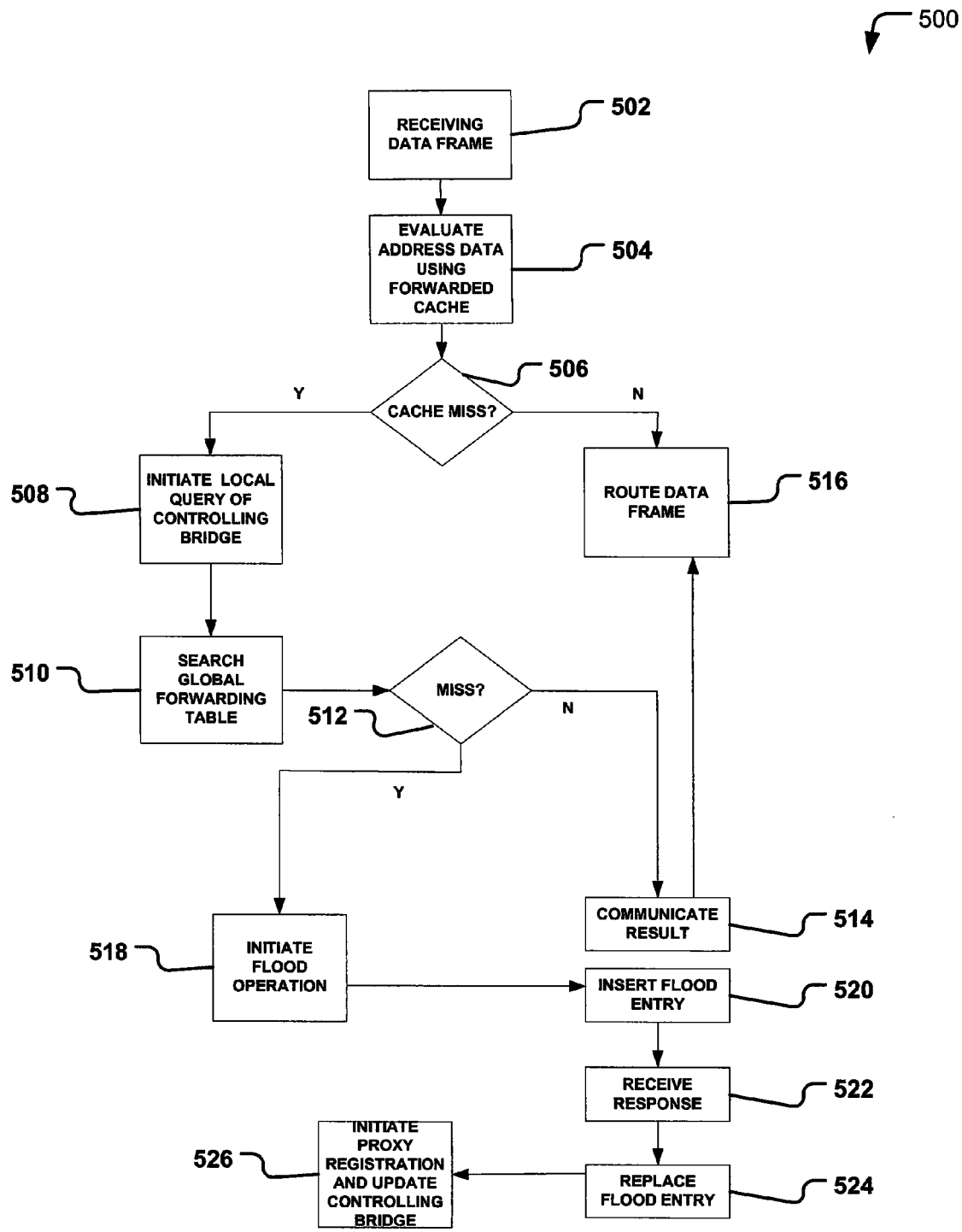
FIG. 5 is a flow diagram of a particular embodiment of a method to learn address data to route a data frame using a distributed virtual bridge.

FIG. 5 shows an embodiment of a method 500 of forwarding data frames and learning address data. The method 500 may be performed by a distributed virtual bridge, such as the distributed virtual bridge 260 of FIG. 2. At 502, a data frame may be received. For example, the bridge element 302 of FIG. 3 may receive a data frame.

Address data of the data frame may be evaluated, at 504. For instance, the bridge element 302 of FIG. 3 may compare a destination address of a data frame against address data stored in the forwarding cache 308. In response to a cache miss, a bridge element local to a controlling bridge may be tasked to perform a search, at 506. For example, a north bridge element may request that a south bridge element query a controlling bridge to locate address data. As such, a local bridge element may receive a request to query the controlling bridge, at 508.

The local bridge element may search a global forwarding table of the controlling bridge, at 510. For example, the bridge element 302 of FIG. 3 may query the global forwarding table 306 of the controlling bridge 304. In the case of a hit in the global forwarding table, at 512, address data may be sent to the requesting bridge element, at 514. The data frame(s) may then be forwarded from the bridge element to the destination address, at 516. That is, one or more data frames may be held until the response is received. When the response is received, all of the data frames may be routed.

A miss in the global forwarding table, at 512, may initiate a flooding operation, at 518. At 520, a flood entry may be entered into the forwarding cache by a bridge element. For example, the bridge element 302 of FIG. 3 may insert a flood entry into the forwarding cache 308. Inclusion of the flood entry may act as a placeholder until the address data that corresponds to the unknown destination address is discovered.

A response to the flood operation may be received, at 522. For example, the bridge element 302 of FIG. 3 may receive a response from a device having a previously unknown source address. The source address of the response may be used to replace the flood entry in the forwarding cache, at 524. For example, the bridge element 302 of FIG. 3 may replace the flood entry with the learned source address in the forwarding cache 308.

A proxy registration may be initialized, and the controlling bridge may be updated, at 526. When a bridge element learns that an address of a computing node is external, the bridge element may notify the controlling bridge in order to reduce flooding operations. For example, the bridge element 302 of FIG. 3 may initiate a proxy registration notification by setting a notify bit in the forwarding cache 308. The controlling bridge 304 may be notified and may asynchronously read the updated forwarding cache 308. The stored address may be retrieved from the controlling bridge 304 without flooding. Where a bridge element was a proxy for an external address, and the address is no longer external, the bridge element may remove the proxy indication and the new address data may be registered.

The global forwarding table 306 of the controlling bridge 304 may be updated with the learned source address. The use of flooding operations may be reduced as a result of the controlling bridge having the learned address data available for searching. The address data updated in the controlling bridge may be accessed in a subsequent query from a bridge element.

In a particular example of proxy registration where a north bridge element initiates a conversation with a device having an external address, the bridge element may send a frame to an external MAC address. The MAC address may not be in the forwarding cache, so the bridge element may install a placeholder entry and send a query to the controlling bridge. The controlling bridge may not have the entry, so the bridge element may mark the entry as "flood." A flooding operation may be performed. The external device may respond to a flooded data frame. The bridge element may perform a lookup on the source address and may find the flood entry. The routing information of the entry may be updated to indicate "external." The bridge element may initiate the proxy notification by setting a notify bit for the entry. The controlling bridge may be notified and may asynchronously read the updated cache entry. Another bridge element may subsequently need to communicate with the external device and may send a query to the controlling bridge. Flooding may be avoided when the address is provided to querying bridge element.

In a particular example of proxy registration where an external device initiates a conversation with a north bridge element, a bridge element may detect that a learned source address in the not-used list is now used for forwarding (e.g. the associated bridge element is not responding). The entry may be marked as used and moved to the used list. The entries in the used list may be stored for a longer period than those in the not-used list. If the address is external, the bridge element may also notify the controlling bridge that the address has been used. Proxy registration may occur when the bridge element sets a notify bit in the entry. The controlling bridge may be notified and may asynchronously read the updated entry. The controlling bridge may install the address data into the global forwarding table for subsequent use by bridge elements. Flooding operations may thus be avoided when a bridge element seeks the address data.

Figure 6:
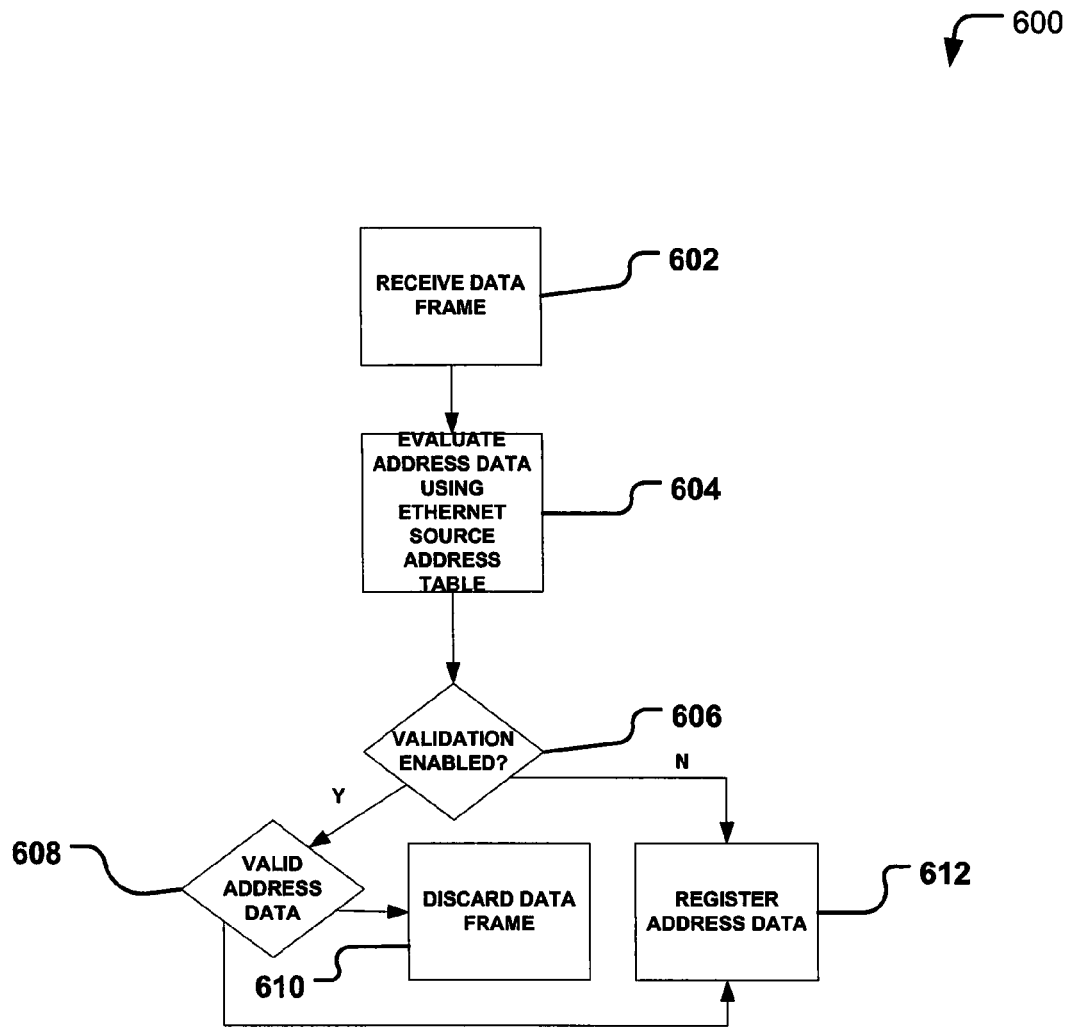
FIG. 6 is a flow diagram of a particular embodiment of a method to learn and register address data.

FIG. 6 shows an embodiment of a method 600 of registering address data with a controlling bridge. An embodiment of the method 600 may be performed by the system 300 of FIG. 3. At 602, a data frame may be received. For example, the bridge element 302 of FIG. 3 may receive a data frame.

The address data of the data frame may be evaluated, at 604. For example, the bridge element 302 may evaluate a source address against data included in the Ethernet-source address table 310. If validation processes are enabled at 606, a determination may be made as to whether or not the source address is valid, or permitted, at 608. This validation may be useful in security scenarios where a limited number of MAC addresses are used at specific ports. When the source address is not successfully validated, or invalid, the data frame may be discarded, at 610.

When the address data is alternatively determined to be valid at 608, the source address may be registered, at 612. For example, the bridge element 302 of FIG. 3 may set a bit in the cache entry to notify the controlling bridge 304 that the source address is active at the port. In this manner, the controlling bridge may learn internal MAC addresses and may detect movement.

Particular embodiments can take the form of an entirely hardware embodiment, an entirely software embodiment, or an embodiment containing both hardware and software elements. Further, embodiments may take the form of a computer program product accessible from a computer-usable or computer-readable medium providing program code for use by or in connection with a computer or any instruction execution system. For the purposes of this description, a computer-usable or computer readable medium can be any apparatus that can contain, store, or communicate the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk, and an optical disk. Examples of optical disks include compact disc—read only memory (CD-ROM), compact disc—read/write (CD-R/W) and DVD. A data processing system suitable for storing and/or executing program code will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution.

While the present invention has been illustrated by a description of various embodiments and while these embodiments have been described in considerable detail, it is not the intention of the Applicants to restrict, or any way limit the scope of the appended claims to such detail. The invention in its broader aspects is therefore not limited to the specific details, representative apparatus, methods, and illustrative examples shown and described. Accordingly, departures may be made from such details without departing from the scope of Applicants' general inventive concept.

The invention claimed is:

1. An apparatus comprising:
a plurality of server computers; and
a distributed virtual bridge comprising:
   a plurality of bridge elements coupled to the plurality of server computers and configured to forward a data frame between the plurality of server computers, wherein the plurality of bridge elements are further configured to automatically learn address data associated with the data frame; and
   a controlling bridge coupled to the plurality of bridge elements, the controlling bridge including a global forwarding table that is automatically updated to include the address data and is accessible to the plurality of bridge elements.

2. The apparatus of claim 1, wherein a first bridge element proximate to the controlling bridge is configured to query the global forwarding table in response to a request from a second bridge element.

3. The apparatus of claim 2, wherein the first bridge element communicates a result from the query to the second bridge element.

4. The apparatus of claim 1, wherein the address data corresponds to an address of a virtual machine that has changed locations.

5. The apparatus of claim 1, wherein the address data corresponds to an address obtained using a flooding operation at a bridge element of the plurality of bridge elements.

6. The apparatus of claim 1, wherein the address data is validated at a bridge element of the plurality of bridge elements.

7. The apparatus of claim 1, wherein a bridge element of the plurality of bridge elements includes an Ethernet-source table configured to store source address information acquired from an incoming data frame.

8. The apparatus of claim 1, wherein a bridge element of the plurality of bridge elements includes a not-used list comprising address data that has been acquired at the bridge element and not used to forward a data frame.

9. The apparatus of claim 1, wherein a bridge element of the plurality of bridge elements includes a forwarding cache comprising a lookup table that stores address data used to forward data frames that are received at the bridge element.

10. The apparatus of claim 1, wherein a bridge element of the plurality of bridge elements is configured to notify the controlling bridge when a learned device address is external to a network.

11. The apparatus of claim 1, wherein the distributed virtual bridge further comprises an integrated switch router configured to receive the data frame.

12. The apparatus of claim 11, wherein the distributed virtual bridge further comprises a transport layer module coupled to a bridge element of the plurality of bridge elements and configured to provide a frame-based interface to the integrated switch router.

13. A method of forwarding a data frame, the method comprising:

receiving a data frame at a distributed virtual bridge comprising:
        a first bridge element coupled to a first server computer, wherein the first bridge element is configured to automatically learn address data from the data frame; and
        a controlling bridge coupled to the first bridge element, the controlling bridge including a global forwarding table configured to store the address data learned by the first bridge element; and
    forwarding the data frame from the first bridge element to a second bridge element of the distributed virtual bridge using the address data.

14. The method of claim 13, further comprising storing as the address data a source address of the data frame received at the first bridge element.

15. The method of claim 13, further comprising storing as the address data an address of a virtual machine that has changed locations.

16. The method of claim 13, further comprising storing as the address data an address acquired during a flooding operation.

17. The method of claim 13, wherein the first bridge element is configured to query the global forwarding table in response to a request sent by a third bridge element.

18. The method of claim 13, further comprising storing the address data at the first bridge element within a not-used list, wherein the address data includes an address that has been acquired at the bridge element and not used to forward a data frame.

19. The method of claim 13, further comprising at least one of validating and registering the address data.

20. A program product, comprising:
    a computer readable storage device storing computer readable program code executable at a bridge element of a distributed virtual bridge to receive a data frame and to learn address data from the data frame, wherein program code is further executable to store the address data at the bridge element, wherein the address data is also stored at a controlling bridge that is coupled to the bridge element.

* * * * *